United States Patent [19]
Williams

[11] 3,861,729
[45] Jan. 21, 1975

[54] VEHICLE SHOCK ABSORBER
[75] Inventor: Oscar Stanley Williams, Arlington, Ind.
[73] Assignee: Philip H. Willkie, Rushville, Md. ; a part interest
[22] Filed: Oct. 30, 1972
[21] Appl. No.: 301,882

[52] U.S. Cl. .............................................. 293/68
[51] Int. Cl. .......................................... B60r 19/06
[58] Field of Search .............. 293/DIG. 2, 71 P, 68; 267/60

[56] References Cited
UNITED STATES PATENTS
| | | | |
|---|---|---|---|
| 1,489,336 | 4/1924 | Wilkinson | 293/68 |
| 3,689,054 | 9/1972 | Gouirand | 293/71 P |

*Primary Examiner*—M. Henson Wood, Jr.
*Assistant Examiner*—Robert Saifer
*Attorney, Agent, or Firm*—Woodard, Weikart, Emhardt & Naughton

[57] ABSTRACT

A shock absorber for a vehicle which translates horizontal impact force of the bumper into vertical force with the vertical force being absorbed by compression of coiled springs and lifting of the vehicle body. One embodiment of the shock absorber includes a first fluid cylinder having a movable piston and rod connected to the vehicle bumper. A second fluid cylinder mounted to the vehicle body has a second piston and rod slidably mounted thereon. The second piston rod has a seating plate attached to its distal end for receiving the top end of the vehicle coil spring. The bottom end of the coil spring is received by the device onto which the vehicle wheel is mounted. A shock absorber is positioned within the coil spring. Fluid pressure lines connect the cylinders and shock absorbers together. Inward movement of the vehicle bumper causes the first piston to exert fluid pressure against the second piston thereby causing compression of the coil spring and lifting of the vehicle body. In an alternate embodiment, an expandable gas bag is utilized in lieu of a cylinder piston arrangement.

9 Claims, 4 Drawing Figures

VEHICLE SHOCK ABSORBER

BACKGROUND OF THE INVENTION

1. Field of the Invention

This invention is in the field of shock absorbers.

2. Description of the Prior Art

Many shock absorbers have been devised for use with a vehicle such as an automobile. Some of these shock absorbers are useful in absorbing both vertical and horizontal forces. For example, see the following U.S. Pat.
No. 1,588,388 issued to L. A. Morines et al;
No. 1,586,866 issued to J. S. Waller; and
No. 1,646,518 issued to W. Barber.

The shock absorber disclosed in the U.S. Pat. No. 1,382,533 issued to R. T. Newton utilizes the vehicle coil springs to neutralize the shocks caused by the front wheels passing over ruts or ridges and also utilizes the coil springs to neutralize shocks caused by collisions. Thus, the same elastic elements that are used to take up the shocks of the wheels also become available to take up the shocks of an eventual collision. Another similar device is disclosed in the U.S. Pat. No. 1,389,229 issued to W. T. Thompson.

Disclosed herein is a shock absorber which translates the horizontal force received from the bumper during collision to a downward vertical force for compressing the vehicle springs and an upward directed force for lifting the vehicle body. The apparatus therefore uniquely minimizes collision damage to a car and the occupants within the car. The inertia of the unsprung vehicle weight and the occupants within the vehicle is therefore utilized along with the absorption capacity of the vehicle springs.

SUMMARY OF THE INVENTION

One embodiment of the present invention is an apparatus for transforming horizontal impact force imported to a vehicle bumper into force for causing upward movement of a vehicle body supported by a coil spring on a vehicle frame comprising first means mountable to the bumper, the spring and the body and being operable when the bumper is impacted to translate horizontal movement of the bumper into force compressing the spring and force to lift the body.

It is an object of the present invention to provide a new and improved shock absorber.

It is a further object of the present invention to provide a new and improved shock absorber for a vehicle.

Yet another embodiment of the present invention is to provide a vehicle shock absorber which translates horizontal impact force received from the bumper into a force which lifts the vehicle body.

In addition, it is an object of the present invention to provide a vehicle shock absorber which translates horizontal impact force received from the vehicle bumper into forces which compress the vehicle coil springs while simultaneously lifting the vehicle body.

Also, it is an object of the present invention to provide a vehicle shock absorber which utilizes the inertia of the unsprung vehicle weight and also utilizes the absorption capacity of the vehicle springs.

A further object of the present invention is to provide a vehicle shock absorber which during impact changes the horizontal impact movement of the vehicle occupants into a resultant movement composed of vertical and horizontal components.

Also, an object of the present invention is to provide a shock absorber which will apply the force impacted to a vehicle bumper to areas of the vehicle frame designed to absorb normal road shock forces.

Related objects and advantages of the present invention will be apparent from the following description.

DESCRIPTION OF THE PREFERRED EMBODIMENTS

Figure 1:
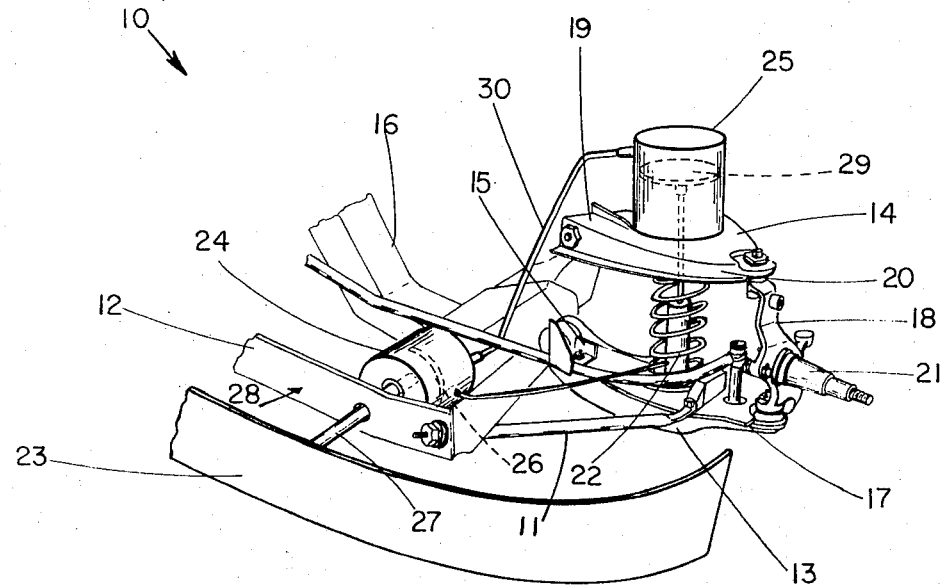
FIG. 1 is a fragmentary perspective view of the front of a vehicle incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a vehicle 10 which has a main body mounted to frame 12. The vehicle shown in FIG. 1 is a typical automobile which includes four wheels rotatably mounted to the frame. One structure for mounting the wheels to the frame is shown in FIG. 1 and includes a lower control arm 13 and an upper control arm 14 pivotally mounted to frame 12. The structure for the mounting of the right front wheel will be described it being understood that a similar description applies to the structure for the left front wheel. The inner end 15 of the lower control arm 13 is bolted to the frame front cross member 16 through rubber bushings. The outer end 17 of the lower control arm 13 is connected to the steering knuckle 18. Likewise, the inner end 19 of the upper control arm is connected to member 16 with the outer end 20 being connected to the steering knuckle 18. Connected to the steering knuckle is axle 21 which rotatably receives the vehicle wheel. The position of the lower control arm is maintained by a brake reaction rod 11 which is mounted to and between the lower control arm 13 and frame 12.

A coil spring 22 (FIG. 3) has a bottom end mounted to the lower control arm 13 with a top end upon which the main body 11' of the vehicle rests. Thus, when the wheel mounted to axle 21 encounters a sudden rise in the pavement, the wheel and axle will move upwardly along with arms 13 and 14 resulting in the compression of coil spring 22 with the main body of the vehicle remaining in the same approximate vertical position. Thus, the coil spring cushily supports the main body with respect to the lower control arm 13. Vehicle 10 is also provided with a front bumper 23.

Means are mounted to bumper 23, main body 11' and coil spring 22 with the means being operable when the bumper is impacted to translate the horizontal movement and force of the bumper into a downward force which compresses spring 22 and an upward force which lifts main body 11'. The means includes a first fluid cylinder 24 and a second fluid cylinder 25. Cylinder 24 is mounted to the vehicle in a convenient place such as to the frame 12. Cylinder 24 includes a first piston 26 which has a rod 27 projecting outwardly of the cylinder. The piston is slidably mounted within the cylinder and will move in the direction of arrow 28 when the vehicle is involved in an accident and the bumper 23 moves towards the frame. Rod 27 is connected to bumper 23. A similar piston 29 is slidably mounted within cylinder 25 and will move whenever piston 26 moves in the direction of arrow 28. A fluid pressure line 30 connects cylinder 24 to cylinder 25 thereby allowing for the application of fluid pressure by piston 26 to piston 29.

Figure 3:
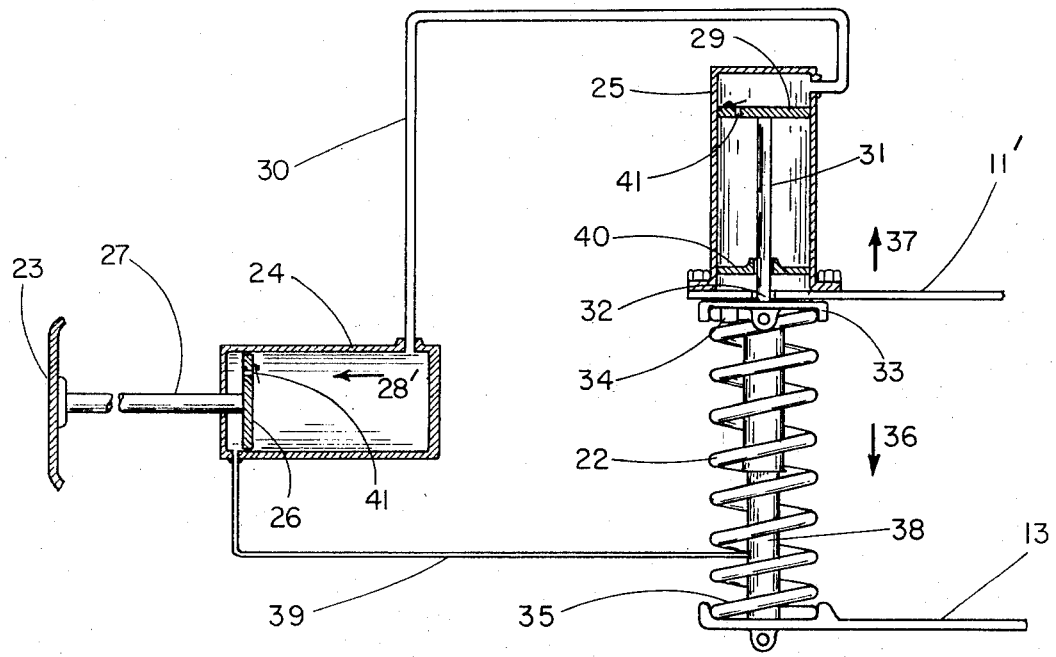
FIG. 3 is an enlarged fragmentary side view of a shock absorbing apparatus incorporating the present invention.

FIG. 3 is an enlarged fragmentary view of the piston and cylinder arrangement previously described. Mounted to piston 29 is a piston rod 31 which extends through the portion of main body 11' upon which cylinder 25 is fixedly mounted. Mounted to the distal end 32 of rod 31 is a seating plate 33 which receives the top end 34 of spring 22. The bottom end 35 of the coil spring is seatingly received by the lower control arm 13. Thus, when bumper 23 is impacted and forced in the direction opposite of arrow 28', pressurized fluid will be forced through line 30 by piston 26 so as to be directed against piston 29. Cylinder 25 which is positioned over coil spring 22 thereby contains the pressurized fluid causing piston 29 and rod 31 to move downwardly in the direction of arrow 36 thereby causing seating plate 33 to compress spring 22. Simultaneously with the compression of the coil springs, cylinder 25 along with the main body 11' of the vehicle are caused to rise in the direction of arrow 37. Thus, relative movement between piston 29 and cylinder 25 results in the translation of the horizontal force from the bumper into opposite vertical force components which compress the vehicle spring while simultaneously lifting the vehicle body.

Shock absorber 38 is surrounded by the coil spring and extends centrally therethrough. The bottom end of the shock absorber 38 is connected to lower control arm 13 whereas the top end of the shock absorber 38 is connected to main body 11'. Typical vehicle shock absorbers such as shown in FIG. 3 are filled with a calibrated amount of fluid and sealed during production; therefore, no refilling or other service is possible other than replacement of deteriorated rubber bushings. A second fluid line 39 is connected to shock absorber 38 and cylinder 24 so as to receive pressurized fluid from shock absorber 38 allowing the pressurized fluid therein to escape to cylinder 24 during the contraction of shock absorber 38. Cylinder 25 includes an end cap 40 which sealingly closes the cylinder and through which rod 31 sealingly projects. Each piston 26 and 29 are provided with fluid leakage apertures 41 which allow the pressure to be equalized on both sides of each piston subsequent to the impact and distribution of forces. The translation of the horizontal movement of the bumper into a force which compresses the coil spring and lifts the main body of the vehicle thereby reduces the forward horizontal movement of the vehicle occupants into a resultant movement composed of vertical and horizontal components.

Figure 2:
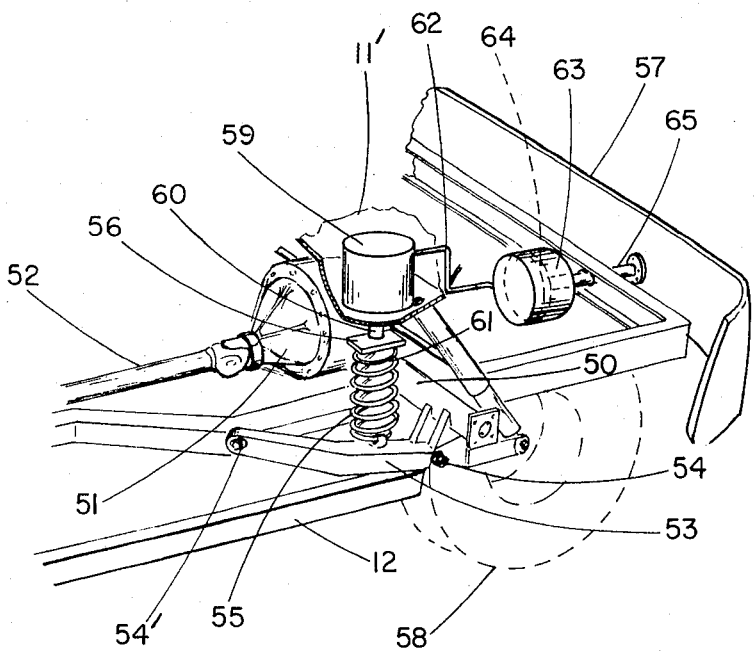
FIG. 2 is a fragmentary perspective view of the rear portion of a vehicle incorporating the present invention.

The rear portion of a conventional vehicle is shown in FIG. 2. Each rear vehicle wheel is rotatably mounted to the rear axle 50 which is coupled by the differential 51 to drive shaft 52. Mounted to frame 12 for each rear wheel is a lower control arm 53. The inner ends 54' of each rear lower control arm 53 are pivotally mounted to the frame with the outer distal ends 54 connected to the axle. A coil spring 55 has its lower end mounted to the lower control arms 53.

The rear bumper 57 is mounted to the vehicle in a manner similar to that described for the front bumper. That is, mounted adjacent to each rear coil spring 55 is a fluid cylinder. These fluid cylinders are connected by pressure lines to another pair of fluid cylinders having piston rods which supportingly receive the rear bumper 57.

The fluid cylinders for the side corresponding to rear wheel 58 will now be described it being understood that a similar description applies to the fluid cylinders for the opposite rear wheels. Fluid cylinder 59 is mounted to main body 11' having a piston slidably mounted therein with a piston rod 60 secured to the piston within cylinder 59. Rod 60 projects through main body 11' and is connected to plate 56 which seatingly receives the top end 61 of coil spring 55. Pressure line 62 is connected to cylinder 59 and to fluid cylinder 63 which likewise has a piston 64 slidably mounted therein. Rod 65 is connected to piston 64 and is also connected to bumper 57. Thus, when bumper 57 is moved towards the frame of the vehicle during impact, fluid pressure is exerted by piston 64 against the piston within cylinder 59 thereby causing downward movement of rod 60 to compress spring 55 and to likewise lift the main body in a manner identical to that described for the fluid cylinders for the front wheels of the vehicle.

Many variations are contemplated and included in the present invention. For example, in lieu of utilizing fluid cylinders, various air bags and pillows may be utilized to distribute the force to the coil springs and the vehicle body. Another variation would be to utilize a rack and pinion to distribute the horizontal movement of the bumper to the vertical movement thereby compressing the coil springs and raising the vehicle body. Other variations include levers and link bars to accomplish the main objective of compressing the coiled springs and raising the vehicle body.

Figure 4:
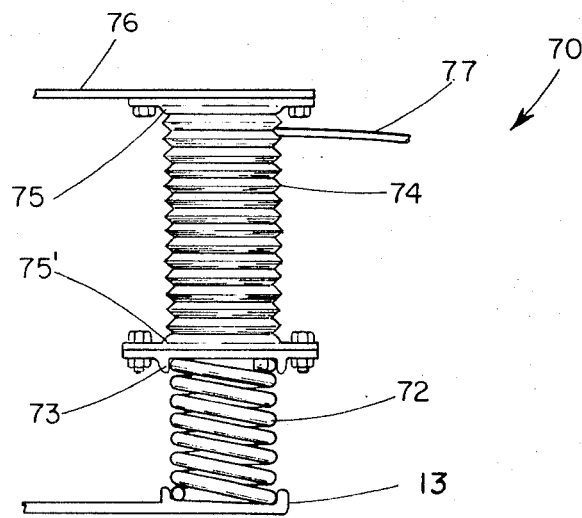
FIG. 4 is a fragmentary side view of an alternate embodiment of a shock absorbing apparatus incorporating the present invention.

FIG. 4 is a fragmentary side view of an alternate embodiment 70 of the invention utilizing an expandable air bag 74 in lieu of the piston and cylinder arrangement 25 and 29 shown in FIG. 3. The top end 75 of air bag 74 is fixedly attached to the main body 76 of the vehicle. The bottom end 75' of bag 74 is fixedly attached to plate 73 which seatingly receives the top end of coil spring 72. The bottom end of spring 72 is seated atop the lower control arm 13. The air bag is connected by means of an air line 77 to a cylinder identical with cylinder 24 which in turn is provided with a piston and rod connected to the bumper. Thus, upon impact the bumper will move toward the main body of the vehicle thereby forcing the attached piston inwardly causing pressurized fluid to flow through line 77 thereby expanding air bag 74. Expansion of bag 74 will result in the compression of spring 72 and the lifting of the main body 76 of the vehicle. The air bag is shown in the expanded position in FIG. 4. Subsequent to impact, the air bag will retract so that the top end of coil spring 72 is positioned immediately adjacent the main body 76 of the vehicle. Of course, a suitable shock absorber may be positioned within spring 72 in a manner identical to that described for the embodiment shown in FIGS. 1 through 3.

The apparatus disclosed herein will reduce the collision impact forces upon the unsprung vehicle mass and the vehicle occupants to approximately one-fourth of the damage normally encountered in a similar accident as compared to a vehicle which does not incorporate the present invention. By lifting the occupants of the vehicle in a direction vertical to the line of vehicle motion, a vertical component is added to the horizontal movement of the occupants thereby causing the occupants to actually travel along an inclined line between vertical and horizontal. Prior art devices typically absorb the collision energy along the applied horizontal line of force only. It is anticipated that the bumpers of the vehicle incorporating the present invention would be mounted within slides so as to provide for the horizontal movement of the bumper toward the vehicle body.

It will be noted that the design of the present invention provides for application of the collision forces upon those portions of the vehicle presently designed to best absorb the application of forces. That is, the supports which receive the coil springs of the vehicle are strengthened to absorb the normal shocks encountered in road travel. These same supports are also utilized to receive the fluid cylinders. Likewise, the fluid cylinders which are connected directly to the bumper may be mounted in a strengthened portion of the vehicle such as the frame.

This invention requires a coupling of that movement of the bumper to the car springing and the body supports where they are joined. Presently designed car parts do not necessarily need be strengthened. This invention utilizes sprung car mass inertia to counterbalance collision created energy. This invention utilizes existing car springing to counterbalance collision created energy. This invention provides for a diverting of the sprung car mass and its occupants onto a line of travel through space tangential to the car mass line of travel at the point collision impact occurs. This invention in increasing the distance the sprung car mass and its occupants travel during a collision reduces the collision force effects geometrically with that travel distance increase.

It will be readily apparent that the absorption capacity of the apparatus will be equal to the mass of the vehicle.

One particular advantage of the present invention is that the capacity to absorb the incoming impact forces is equal to the mass of the vehicle. Thus, substantial forces may be readily absorbed. It should be understood that the resultant movement of the vehicle occupants does not have to be linear. The resultant movement of travel of the vehicle occupants will depend upon the fluid which is utilized in the fluid cylinders. For example, the fluid may be a liquid or a gas. It will be obvious from the above description that the present invention contemplates and includes fluid cylinders for the front wheels of a vehicle and/or for the rear wheels of the vehicle. Likewise, it is also possible to provide fluid cylinders for each vehicle wheel thereby providing the maximum protection in the event of a rear or forward impact. The fluid cylinders may be interconnected together thereby raising the entire vehicle body evenly although only a portion of one of the bumpers is impacted. To prevent unnecessary vertical movement of the vehicle body when traveling over rough pavement, various latching devices may be provided to latch the seating plates 33 and 56 to the vehicle body.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. In combination with a vehicle which includes a main frame, a vehicle body mounted on said frame, a wheel supporting device connected to said frame, a coil spring with one end mounted to said device and an opposite end cushily supporting said body with respect to said device, and a bumper mounted to said vehicle, wherein the improvement comprises:

a first means connected to said bumper, said body and said spring being operable when said bumper is impacted to translate horizontal force through said bumper into downward force compressing said spring and upward force lifting said body;

said first means includes fluid cushion means having a fluid output line, said first means further includes lifting means connected to said line being operable to lift said body upon receipt of pressurized fluid from said line, said cushion means being connected to said bumper and operable to force pressurized fluid out through said line into said lifting means to lift said body when said bumper moves toward said frame upon impact.

2. The combination of claim 1 wherein:

said first means includes a first fluid cylinder with a first piston and a first rod slidably mounted therein, said cylinder being mounted to said body over said coil spring with said rod having an enlarged plate secured thereto positioned between said body and said spring and seatingly receiving said spring, said cylinder being connected to said fluid output line to receive pressurized fluid therefrom to cause relative movement between said cylinder and said piston to compress said spring while lifting said body.

3. The combination of claim 2 wherein:

said fluid cushion means includes a second fluid cylinder with a second piston slidably mounted therein and connected to said bumper.

4. The combination of claim 3 wherein:

said combination includes a shock absorber mounted to said body and said device and surrounded by said coil spring; and, said second cylinder having a second fluid line connected to said shock absorber to receive pressurized fluid therefrom as said shock absorber contracts.

5. The combination of claim 4 wherein:

said frame includes a lower control arm and an upper control arm pivotally mounted thereto with said spring disposed between said lower control arm and said upper control arm, said frame further includes a steering knuckle mounted to said lower control arm and said upper control arm with a wheel mounted thereto;

said first cylinder is mounted directly atop said upper control arm with said first rod extending through said upper control arm, said enlarged plate being positioned between said upper control arm and said coil spring, said first cylinder includes a bottom end plate sealingly closing said first cylinder with said first rod projecting through said bottom end plate; and, said first piston and said second piston each have a hole therethrough to allow passage of fluid through said first piston and said second piston.

6. An apparatus for transforming horizontal impact force imparted to a vehicle bumper into force for causing upward movement of a vehicle body supported by a coil spring on a vehicle frame comprising:

first means mountable to said bumper, said spring and said body and being operable when said bumper is impacted to translate horizontal movement of said bumper into force compressing said spring and force to lift said body;

said means includes a first fluid cylinder mountable to said body, said first cylinder includes a first piston slidably mounted therein with a first rod secured to said first piston, said first rod projecting outwardly of said first cylinder and having an outer end with a seating plate mounted thereto which receives one end of said coil spring; and, said first means further includes cushion means connectable to said vehicle bumper and said first cylinder and being operable to direct pressurized fluids against said first piston when said bumper is impacted to cause relative motion between said first piston and said first cylinder compressing said spring and lifting said body.

7. The apparatus of claim 6 wherein:

said cushion means includes a second fluid cylinder with a second piston and second rod slidably mounted therein, said second rod is connected to said bumper with said second cylinder connected to said first cylinder by a pressure line to convey fluid pressure to said first piston as said bumper moves to said second piston during vehicle impact.

8. An apparatus for transforming horizontal impact force imparted to a vehicle bumper into force for causing upward movement of a vehicle body supported by a coil spring on a vehicle frame comprising:

first means mountable to said bumper, said spring and said body and being operable when said bumper is impacted to translate horizontal movement of said bumper into force compressing said spring and force to lift said body;

said first means includes an expandable gas bag mountable to and between said body and said coil spring, said first means further includes cushion means connectable to said bumper and said bag being operable to direct pressurized gas into said bag when said bumper is impacted.

9. The combination of:

a vehicle having a vehicle body mounted on a vehicle frame;

at least one coil spring having a bottom end seated on said frame and a top end supporting said body;

a bumper movably mounted to said vehicle;

first means mounted on said frame and connected to said bumper, said first means being operable to assume a first position upon movement of said bumper toward said body; and, second means connected to said first means and mounted on said body, said second means having a movable portion disposed between said main body and said top end of said spring, said second means being operable upon said first means assuming said first position to move said movable portion to compress said spring and lift said body;

said movable portion is a piston rod with an enlarged outer end seatingly receiving said top end of said spring.

* * * * *

UNITED STATES PATENT OFFICE
CERTIFICATE OF CORRECTION

Patent No. 3,861,729         Dated January 21, 1975

Inventor(s) VEHICLE SHOCK ABSORBER

It is certified that error appears in the above-identified patent and that said Letters Patent are hereby corrected as shown below:

Please change the address of the Assignee from "Maryland" to --Indiana--.

Signed and sealed this 1st day of April 1975.

(SEAL)
Attest:

RUTH C. MASON
Attesting Officer

C. MARSHALL DANN
Commissioner of Patents
and Trademarks